June 25, 1957 C. E. FOX 2,796,915
PORTABLE AUXILIARY SEAT
Filed June 22, 1954 2 Sheets-Sheet 1

INVENTOR.
Clayton E. Fox
BY
McMorrow, Berman & Davidson
ATTORNEYS

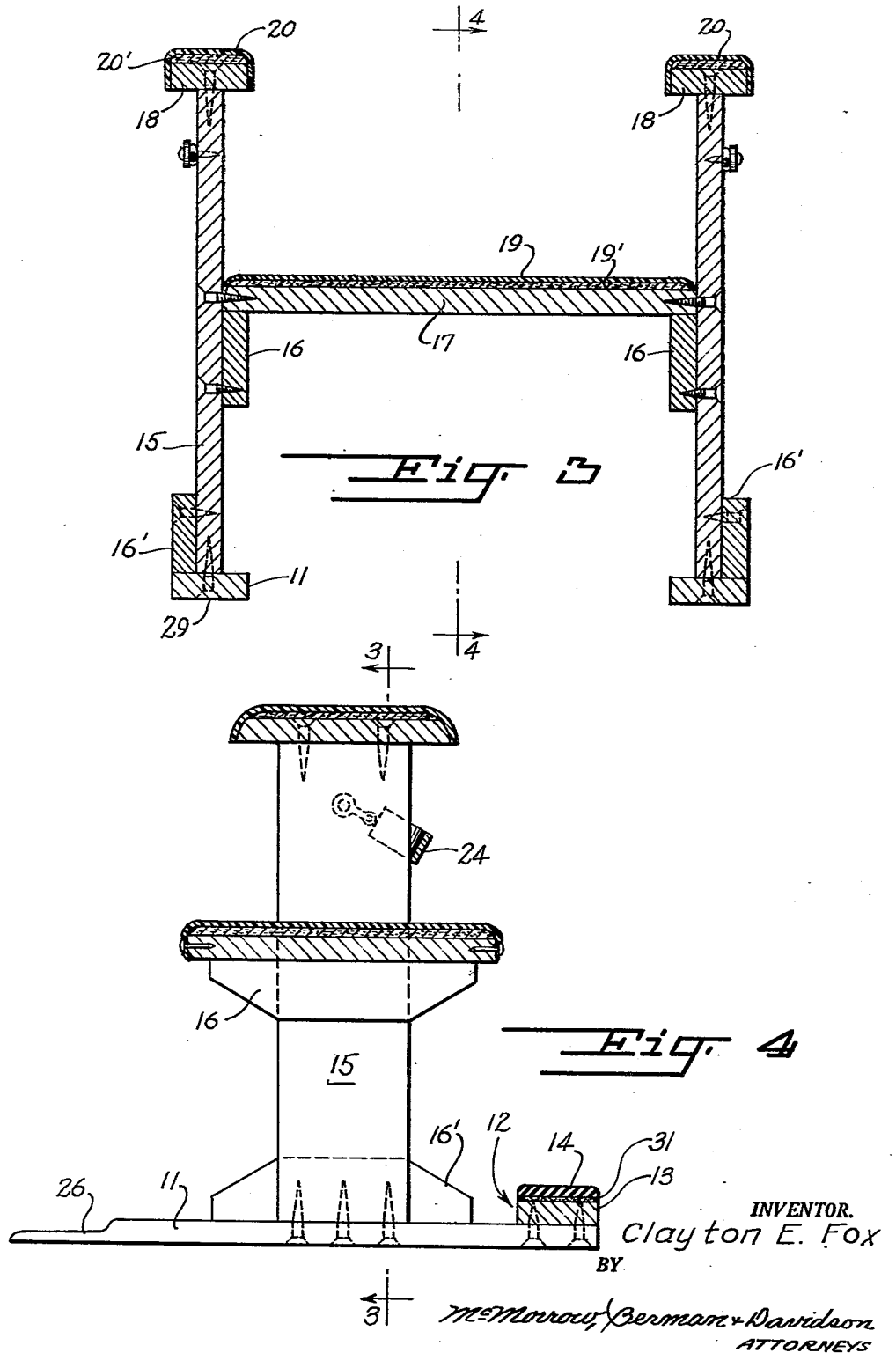

2,796,915
PORTABLE AUXILIARY SEAT
Clayton E. Fox, Toledo, Ohio

Application June 22, 1954, Serial No. 438,441

2 Claims. (Cl. 155—10)

This invention relates to a portable seat adapted to be installed on the seat of a larger backed seat, such as a chair or the seat of an automobile, the portable seat of this invention being especially adapted for the use of children. The invention also relates to a seat equipped with such a portable seat.

It is a primary object of this invention to provide a portable seat adapted to be installed on a backed chair or seat in a manner to fit firmly thereon while contacting such supporting chair or seat at a minimum of points to avoid wear.

It is a further object of this invention to provide such a portable seat adapted for a child to provide both a foot rest therefor and a means of latching the child in the seat.

It is also an object of this invention to provide a backed seat means such as a backed chair or as an automobile seat equipped with a smaller portable seat which may be easily installed thereon so as to support a person, as a child, with a minimum wear of the surface of the supporting means.

Other and further objects will be apparent when the specification is considered in connection with the drawings in which:

Figure 3 is a sectional elevation taken along line 3—3 of Figure 2; and

Figure 4 is a sectional elevation taken along line 4—4 of Figure 3.

Figure 1:
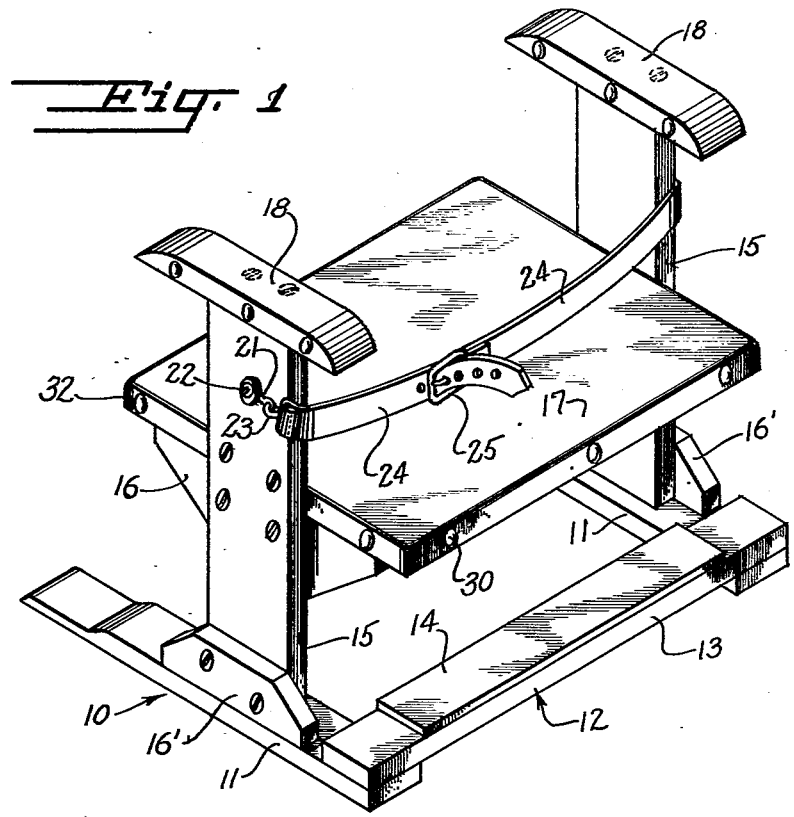
Figure 1 is a perspective view of one embodiment of the portable seat of the invention.

Referring in detail to the drawings, as shown in Figure 1, a portable seat 10 has runners 11 spaced apart by a foot rest 12 which includes the cross-member 13 and the pad or foot contact 14. Uprights 15 extend above each runner 11 and have gussets 16 thereon to support a seat member 17 which rests upon the gussets and bears sidewardly against the uprights 15. Foot braces 16' brace each upright 15 sidewardly and an arm rest 18 extends across the top of each upright. A cover 19 may be provided for the seat member 17 and covers 20 may be provided for the arm rests 18. To secure a child in such a portable seat 10 a shackle 21 is provided on each upright and connected thereto at one end by a screw 22. At the other end the shackle 21 is connected to an eyelet 23 on a leather thong 24, such leather thong being in turn connected across the front of the seat 10 and across the waist of one to be installed in the seat by the latching of a buckle 25 which connects the thongs.

As a feature of construction an extension 26 of each runner 11 is streamlined to slide between the bottom of a back cushion 27 and the seat cushion 28 as of a car seat.

A portable seat which may carry out the spirit of this invention may be made out of a wide variety of materials, but in the embodiment shown the material employed for the structural members is preferably wood and the assembly of the various structural elements is effected by the employment of wood screws 29 as shown. On the other hand the covers may be installed by a variety of means. As seen most clearly in Figures 3 and 4 the covers 19 and 20 may have pads 19' and 20' thereunder for added ease and installation of the covers may be effected by furniture brads 30. On the other hand a glue or adhesive 31 may affix the foot pad 14 to the foot rest cross-piece 13.

Figure 2:
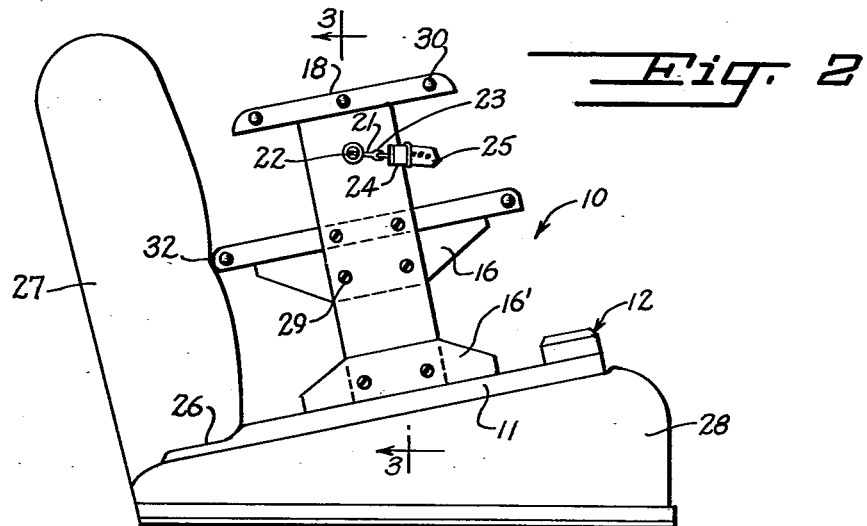
Figure 2 is a side elevation of the portable seat of Figure 1 installed on an automobile seat.

In practice rear end 32 of the seat member 17 had best be rounded as indicated in Figures 2 and 4 with the result that no sharp corner may bear against the back cushion 27. In this regard it is pointed out that the surfaces of the portable seat which contact the automobile seat or the chair on which installed are especially designed to maintain such contact over a minimum area with a consequent minimum opportunity for tearing or wearing the supporting member.

With further regard to the maintenance of a minimum contact of the auxiliary seat with the seat and back cushions 28, 27, as will be noted from Figure 2 of applicant's drawing the back edge of the seat member is in substantial vertical alignment with the rear ends of runners 11, from which rear ends the extensions 26 project rearwardly between the back cushion 27, and seat cushion 28. Said rear ends of runners 11, in the inserted positions of the extensions 26, terminate substantially flush with the front surface of the back cushion 27, and as shown in Figure 2, the front surface of the back cushion 27 is flexible, so as to be capable of being pressed inwardly, this being conventional in an automobile seat. Due to the vertical alignment of the back edge of the seat member with the extension-provided rear extremities of the runners 11, the back edge of the seat member will press against the flexible front surface of the back cushion 27, pressing it inwardly to a slight extent. A firm engagement of the auxiliary seat with the automobile seat is thus provided, while still holding the areas of contact of the auxiliary seat, with the automobile seat to a minimum. It will be further observed that the use of a single upright at each side of the auxiliary seat, with the back and front edges of the seat member being spaced rearwardly, and forwardly, respectively, from the respective side edges of the uprights, causes the uprights to be spaced outwardly from the back cushion 27. Still further, the arm rests 18 are shorter in length than the runners 11 or seat member 17, and are connected medially between their ends to the upper ends of the uprights thus causing the rear extremities of the arm rests to be spaced forwardly, wholly out of contact with the back cushion.

This invention broadly considers a portable seat adapted to be firmly installed on a backed chair or automobile seat with a minimum of ease and a minimum opportunity for injuring the supporting member and it also considers the combination of a supporting member with a portable seat thereon, it being herein asserted that the invention is not limited to the portable seat embodiment shown, or to the combination of portable seat and supporting elements shown, but broadly this invention includes a wide number of variations and modifications which fall within the broad spirit of the invention and within the broad scope claimed and merited for the appended claims.

What is claimed is:

1. A portable auxiliary seat for attachment to a larger seat having a seat cushion and an upholstered back cushion formed with a flexible front surface, comprising: a pair of parallel runners adapted to rest on said seat cushion; a pair of extensions rigid with and projecting rearwardly from one end of the respective runners in longitudinal alignment therewith, said extensions being reduced in thickness relative to the thickness of the runners for insertion of the extensions between the seat and back cushions with said one ends of the runners terminating substantially flush with said front surface of the back cushion; a foot rest connected at its ends to and extending between the other ends of the runners; a single upright fixedly secured to each of the runners medially between said ends of the runners; and a flat seat member carried by and extending between the uprights, said seat member being fixedly connected at its sides to the uprights and having front and back edges respectively spaced forwardly and rearwardly of the uprights, the back edge of the seat member being aligned substantially vertically with the first named ends of the runners to press against the flexible front surface of the back cushion.

2. A portable auxiliary seat for attachment to a larger seat having a seat cushion and an upholstered back cushion formed with a flexible front surface, comprising: a pair of parallel runners adapted to rest on said seat cushion; a pair of extensions rigid with and projecting rearwardly from one end of the respective runners in longitudinal alignment therewith, said extensions being reduced in thickness relative to the thickness of the runners for insertion of the extensions between the seat and back cushions with said one ends of the runners terminating substantially flush with said front surface of the back cushion; a foot rest connected at its ends to and extending between the others ends of the runners; a single upright fixedly secured to each of the runners medially between said ends of the runners; a flat seat member carried by and extending between the uprights, said seat member being fixedly connected at its sides to the uprights and having front and back edges respectively spaced forwardly and rearwardly of the uprights, the back edge of the seat member being aligned substantially vertically with the first named ends of the runners to press against the flexible front surface of the back cushion; and arm rests secured medially between their ends to the upper ends of the uprights in parallelism with the runners, said arm rests being substantially shorter in length than the distance between the front and back edges of the seat member, for disposition of the arm rests out of contact with said front surface of the back cushion.

References Cited in the file of this patent

UNITED STATES PATENTS

| | | |
|---|---|---|
| 1,407,408 | Gray | Feb. 21, 1922 |
| 2,515,527 | Robinson | July 18, 1950 |
| 2,642,923 | Roeder | June 23, 1953 |

FOREIGN PATENTS

| | | |
|---|---|---|
| 559,706 | Great Britain | Mar. 1, 1944 |